US008156493B2

(12) United States Patent
Ellis et al.

(10) Patent No.: US 8,156,493 B2
(45) Date of Patent: Apr. 10, 2012

(54) EXCEPTION HANDLING IN A CONCURRENT COMPUTING PROCESS

(75) Inventors: Edric Ellis, Huntington (GB); Jos Martin, Burwell (GB)

(73) Assignee: The MathWorks, Inc., Natick, MA (US)

( * ) Notice: Subject to any disclaimer, the term of this patent is extended or adjusted under 35 U.S.C. 154(b) by 1359 days.

(21) Appl. No.: 11/402,748

(22) Filed: Apr. 12, 2006

(65) Prior Publication Data

US 2007/0245053 A1 Oct. 18, 2007

(51) Int. Cl.
G06F 9/46 (2006.01)
G06F 13/24 (2006.01)
G01R 31/08 (2006.01)
H04L 12/26 (2006.01)

(52) U.S. Cl. ......... 718/100; 370/216; 370/242; 710/260

(58) Field of Classification Search ........................ None
See application file for complete search history.

(56) References Cited

U.S. PATENT DOCUMENTS

| 5,339,425 | A | * | 8/1994 | Vanderah et al. ............... 718/102 |
| 5,561,784 | A | * | 10/1996 | Chen et al. .................... 711/157 |
| 5,613,071 | A | | 3/1997 | Rankin et al. |
| 5,892,957 | A | | 4/1999 | Normoyle et al. |
| 6,195,591 | B1 | * | 2/2001 | Nixon et al. ..................... 700/83 |
| 6,404,744 | B1 | * | 6/2002 | Saito ............................. 370/255 |
| 6,415,332 | B1 | * | 7/2002 | Tuel, Jr. ......................... 719/313 |
| 6,542,934 | B1 | * | 4/2003 | Bader et al. ................... 709/239 |
| 6,640,247 | B1 | * | 10/2003 | Kishi ............................. 709/224 |
| 6,714,961 | B1 | * | 3/2004 | Holmberg et al. ............. 718/106 |
| 7,149,832 | B2 | * | 12/2006 | Wieland et al. ............... 710/269 |
| 7,317,545 | B2 | | 1/2008 | Tamura |
| 7,493,657 | B1 | | 2/2009 | Krishnaswamy et al. |
| 7,876,693 | B2 | * | 1/2011 | Mathews et al. ............... 370/244 |
| 2001/0034751 | A1 | * | 10/2001 | Eto et al. ....................... 709/100 |
| 2001/0040873 | A1 | | 11/2001 | Nakagawa et al. |
| 2003/0105902 | A1 | | 6/2003 | Burgess |
| 2003/0105990 | A1 | * | 6/2003 | Kawai et al. ..................... 714/25 |
| 2004/0221203 | A1 | * | 11/2004 | Ruhlen et al. ................... 714/38 |
| 2004/0260803 | A1 | * | 12/2004 | Nakamura ..................... 709/224 |
| 2005/0050305 | A1 | * | 3/2005 | Kissell ........................... 712/220 |
| 2005/0102370 | A1 | * | 5/2005 | Lin et al. ....................... 709/217 |

(Continued)

OTHER PUBLICATIONS

Van Roy, Peter et al., "Distributed Programming in Mozart—A Tutorial Introduction," retrieved online at mozart-oz.org/documentation/dstutorial/ (2003).
International Search Report for Application No. PCT/US2007/009073, dated Oct. 29, 2007.

*Primary Examiner* — Emerson Puente
*Assistant Examiner* — Adam Lee
(74) *Attorney, Agent, or Firm* — Nelson Mullins Riley & Scarborough LLP

(57) ABSTRACT

The present invention provides a method and system for exception handling in an executable process executing in a concurrent computing environment. The present invention allows a user to interrupt the executable process at any stage of the computation without disconnecting the communication channel among the instances of the executable process. Additionally, the present invention also allows interrupting the concurrent computing process at any stage when an error occurs in the executable process or the communication channel without terminating the communication among the instances of the executable process. Upon notification of an interrupt request, each of the instances of the executable process in the concurrent computing environment flushes any pending incoming messages to return itself to a previous known state while maintaining the communication channel between the instances of the executable process.

21 Claims, 4 Drawing Sheets

U.S. PATENT DOCUMENTS

| | | | |
|---|---|---|---|
| 2006/0002402 A1* | 1/2006 | Nalawade et al. | 370/401 |
| 2006/0173960 A1 | 8/2006 | Zlateff et al. | |
| 2006/0200584 A1* | 9/2006 | Bhat | 709/249 |
| 2006/0271718 A1* | 11/2006 | DiPlacido et al. | 710/263 |
| 2007/0266190 A1* | 11/2007 | Ellis et al. | 710/260 |
| 2008/0077925 A1 | 3/2008 | Aridor et al. | |

* cited by examiner

EXCEPTION HANDLING IN A CONCURRENT COMPUTING PROCESS

TECHNICAL FIELD

The present application generally relates to a concurrent computing process and more specifically to exception handling in the concurrent computing process.

BACKGROUND OF THE INVENTION

MATLAB® is a product of The MathWorks, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization and algorithm development. MATLAB® integrates numerical analysis, matrix computation, signal processing, and graphics in an easy-to-use environment where problems and solutions are expressed in familiar mathematical notation, without traditional programming. MATLAB® is used to solve complex engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming such as Fortran or C.

As a desktop application, MATLAB® allows scientists and engineers to interactively perform complex analysis and modeling in their familiar workstation environment. With many engineering and scientific problems requiring larger and more complex modeling, computations accordingly become more resource intensive and time-consuming. However, a single workstation can be limiting to the size of the problem that can be solved, because of the relationship of the computing power of the workstation to the computing power necessary to execute computing intensive iterative processing of complex problems in a reasonable time. For example, a simulation of a large complex aircraft model may take a reasonable time to run with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single workstation would take an unreasonable or undesirable amount of time to perform these simulations. Therefore, it is desirable to perform a computation concurrently using multiple workstations when the computation becomes so large and complex that it cannot be completed in a reasonable amount of time on a single workstation.

Applications that are traditionally used as desktop applications, such as MATLAB®, need to be modified to be able to utilize the computing power of concurrent computing, such as parallel computing and distributed computing. Each machine or workstation needs to have its local copy of the application and between the different instances of the application, there needs to be a way to communicate and pass messages between the machines and workstations so that the multiple machines or workstations in the concurrent computing environment can collaborate with each other.

One example of a message passing method that establishes a communication channel between machines or workstations is Message Passing Interface (MPI). MPI is a standard for an interface for message passing that has been used between parallel machines or workstations in concurrent computing systems. In conventional concurrent computing systems, computing applications, which make use of MPI communications must be launched using a launcher program (usually called "mpirun" or "mpiexec"). An example of the syntax for calling mpirun is as follows.

mpirun-np<number of processes><application name and arguments>

Once an application has been launched using the above MPI method on a concurrent computing system and an error occurs, the default behavior is to abort all the parallel processes immediately and disconnect the communication channel established between the multiple machines and workstations. This behavior is not desirable as connections need to be re-established before concurrent computing can be utilized again.

SUMMARY OF THE INVENTION

The present invention provides a method and system for exception handling in an executable process executing in a concurrent computing environment. The present invention allows a user to interrupt the executable process at any stage of the computation without disconnecting the communication channel among the instances of the executable process. Additionally, the present invention also allows interrupting the concurrent computing process at any stage when an error occurs in the executable process or the communication channel without terminating the communication among the instances of the executable process. Upon notification of an interrupt request, each of the instances of the executable process in the concurrent computing environment flushes any pending incoming messages to return itself to a previous known state while maintaining the communication channel between the instances of the executable process.

In one embodiment of the present invention, a method for providing exception handling among a plurality of instances of a concurrent computing process is provided. The method includes the step of launching the plurality of instances of the concurrent computing process on one or more computing devices, where the plurality of instances includes a first instance and a second instance. The method also includes the step of establishing a communication channel for communication among the plurality of instances thereby forming a collaboration to execute a computational job. The method further includes the step of executing the computational job concurrently on the plurality of instances. The method also includes the steps of detecting an interrupt request on one of the plurality of instances and terminating the execution of the computational job while maintaining the communication among the plurality of instances established by the communication channel.

In one aspect of the present invention, the interrupt request is sent from a user instructing the termination of the execution of the computational job. The interrupt request may be instead caused by an error occurred in the concurrent computing process. The interrupt request may also be caused by an error occurred in the communication channel. In another aspect of the present invention, the method may further include the steps of: notifying the first instance of the detection of the interrupt request and notifying the second instance of the detection of the interrupt request. The method may also include the step of terminating a sending of a data and a receiving of the data between the first instance and the second instance. The method may further include the step of returning the first instance and the second instance to a state prior to the sending and the receiving of the data between the first and second instances. In a further aspect of the present invention, the method includes the further step of returning the plurality of instances to a state prior to the execution of the computational job.

In another embodiment of the present invention, a storage medium storing computer-implemented instructions for providing exception handling among a plurality of instances of a concurrent computing process is provided. The instructions include instruction for launching the plurality of instances of the concurrent computing process on one or more computing devices. The instructions can also include instruction for establishing a communication channel for communication among the plurality of instances thereby forming a collaboration to execute a computational job. The instructions can further include instruction for executing the computational job concurrently on the plurality of instances. The instructions can also include the instructions for detecting an interrupt request on one of the plurality of instances and terminating the execution of the computational job while maintaining the communication among the plurality of instances established by the communication channel.

In a further embodiment of the present invention, a system providing exception handling among a plurality of instances of a concurrent computing process is provided. The system includes an executable process comprising a concurrent computing environment for allowing a plurality of instances of the executable process to execute concurrently, the plurality of instances establish communication via a communication channel and form a collaboration to execute a computational job, where the executable process is capable of detecting an interrupt request associated with the computational job and terminate the execution of the computational job without terminating the communication via the communication channel.

In one aspect of the present invention, the interrupt request is sent from a user instructing the termination of the execution of the computational job. The interrupt request can also be caused by an error occurred in the concurrent computing process or an error occurred in the communication channel.

In yet another embodiment of the present invention, a method for a computing device to distribute to a remote computing device a plurality of instructions is provided. The method includes receiving a request from the remote computing device for the plurality of instructions. The plurality of instructions include the instructions for launching the plurality of instances of the concurrent computing process on one or more computing devices, wherein the plurality of instances includes a first instance and a second instance; establishing a communication channel for communication among the plurality of instances thereby forming a collaboration to execute a computational job; executing the computational job concurrently on the plurality of instances; detecting an interrupt request on one of the plurality of instances; and terminating the execution of the computational job while maintaining the communication among the plurality of instances established by the communication channel. The method also includes forwarding the plurality of instructions to the remote computing device. In one aspect of the present invention, the computing device is a server. The remote computing device can be, but not limited to, a client or a node on a network, such as the Internet.

BRIEF DESCRIPTION OF THE FIGURES

The foregoing and other objects, aspects, features, and advantages of the invention will become more apparent and may be better understood by referring to the following description taken in conjunction with the accompanying drawings, in which.

DETAILED DESCRIPTION

The following illustrative embodiments will be described solely for illustrative purposes relative to a MATLAB®-based technical computing environment. Although the illustrative embodiment will be described relative to a MATLAB®-based application, one of ordinary skill in the art will appreciate that the present invention may be applied to parallel or distributed processing of technical computing tasks with other technical computing environments, such as technical computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

Figure 1:
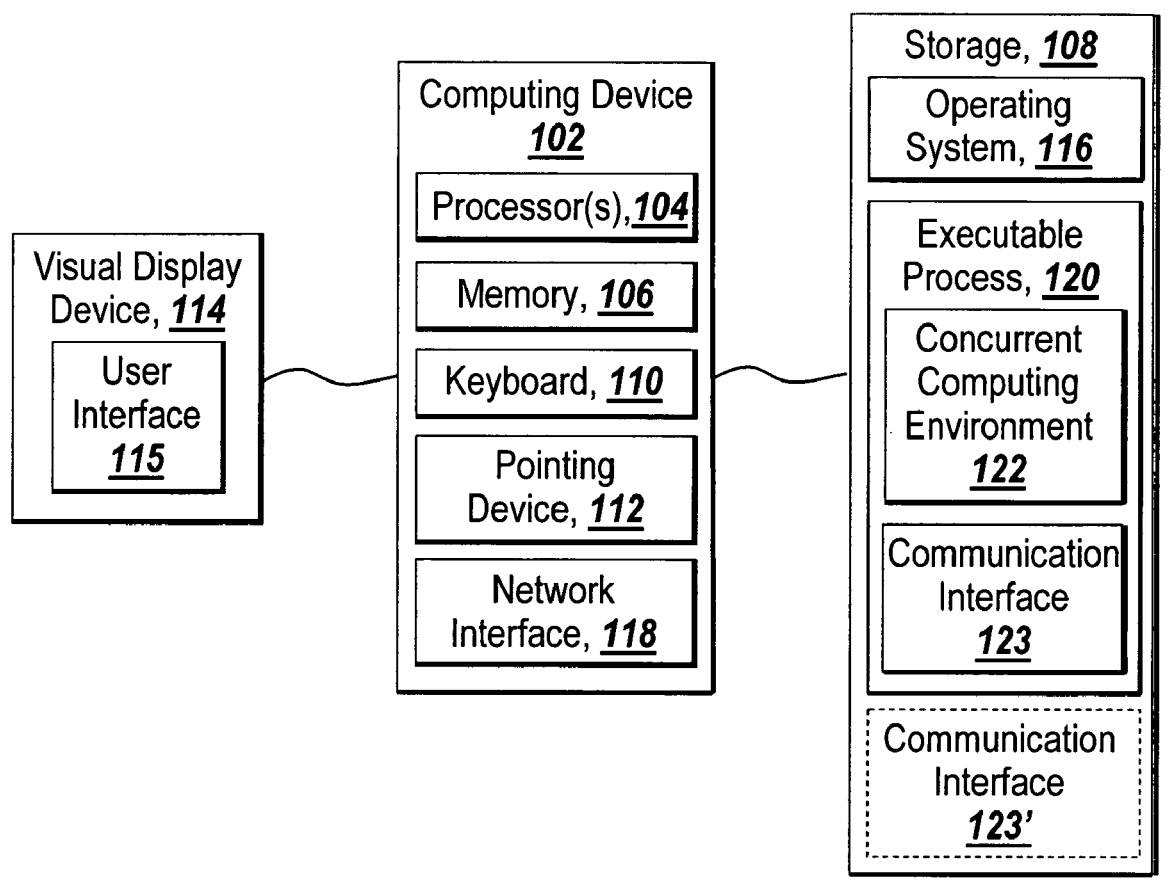
FIG. 1 is a block diagram of a computing device suitable for practicing an embodiment of the present invention.

FIG. 1 depicts an environment suitable for practicing an illustrative embodiment of the present invention. The environment includes a computing device 102 having memory 106, on which software according to one embodiment of the present invention may be stored, one or more processors 104 for executing software stored in the memory 106, and other programs for controlling system hardware. Each of the one or more processors 104 can be a single or multiple core processor. Virtualization can be employed in computing device 102 so that infrastructure and resources in the computing device can be shared dynamically. Virtualized processors may also be used with executable process 120 and other software in storage 108. A virtual machine can be provided to handle a process running on multiple processors so that the process appears to be using only one computing resource rather than multiple. Multiple virtual machines can also be used with one processor. Other computing resources, such as FPGA, ASIC, DSP, and GPP, may also be used for executing code and/or software. A hardware accelerator can additionally be used to speed up the general processing rate of the computing device 102.

The memory 106 may comprise a computer system memory or random access memory such as DRAM, SRAM, EDO RAM, etc. The memory 106 may comprise other types of memory as well, or combinations thereof. A user may interact with the computing device 102 through a visual display device 114 such as a computer monitor, which may include a user interface 115. The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may further comprise a storage device 108, such as a hard-drive or CD-ROM, for storing an operating system 116 and other related software, and for storing executable process 120, such as parallel computing with MATLAB® or distributed computing with MATLAB®. Executable process 120 can be, but is not limited to, an application, a program, a module, or a script. Executable process 120 may include a concurrent computing environment 122 to enable concurrent computing on the computing device 102. Executable process 120 can also include a communication interface 123, such as MPI or other suitable interface, for setting up a communication channel with another computing device to form a collaboration (discussed later). One of ordinary skill in the art will appreciate that communication interface 123 can be adapted to be included as part of the executable process 120, or it can be a stand-alone application, module, script, or program that responds to calls from executable process 120, such as communication interface 123'. Additionally, the operating system 116 and executable process 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein.

Figure 2:
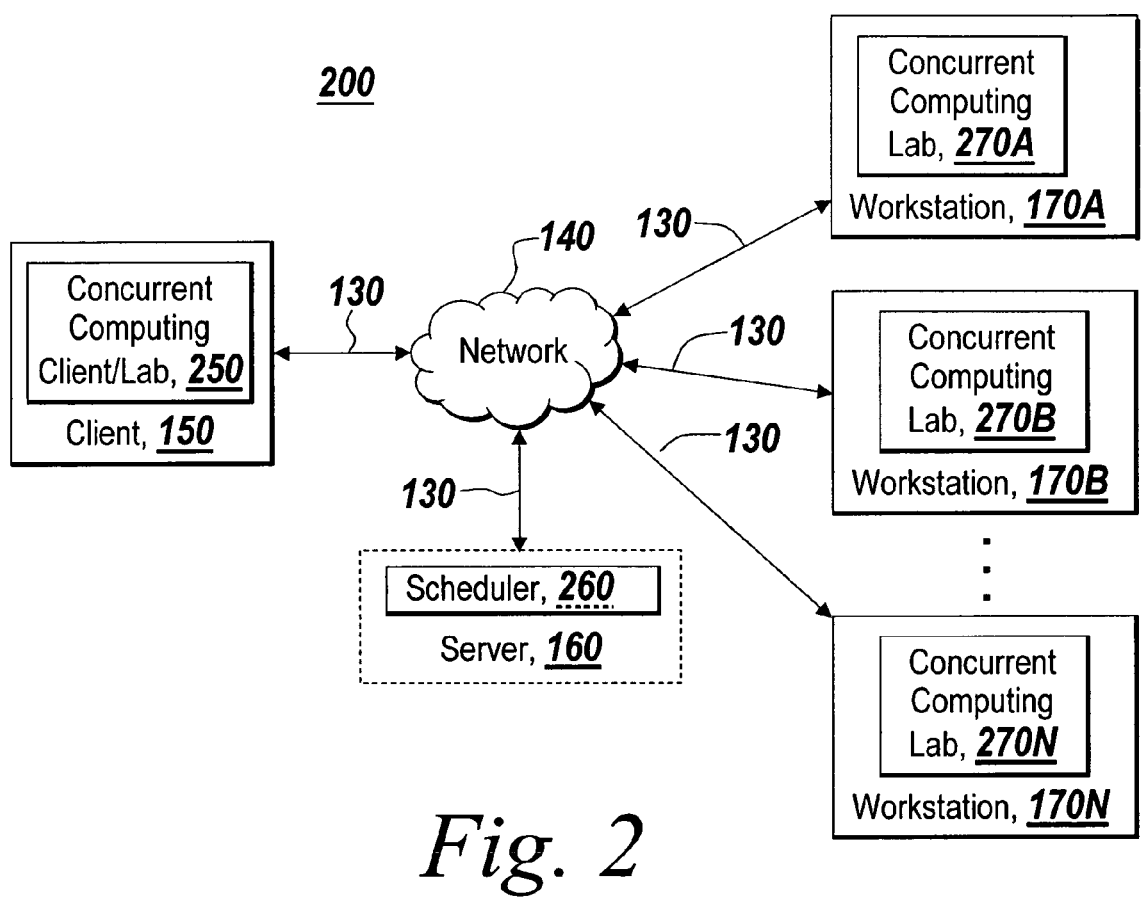
FIG. 2 is a block diagram of a concurrent computing system including more than one computing device for practicing an embodiment of the present invention.

FIG. 2 depicts a concurrent computing system 200 that is suitable for practicing the illustrative embodiment of the present invention. In brief overview, the system 200 comprises a concurrent computing client 250 running on a client 150, concurrent computing labs 270A-N on workstations 170A-N, and optionally a server 160. A concurrent computing lab is a computing resource that performs distributed computing or parallel computing. A computing resource can be a processor, a computer system, or other hardware with computational capabilities. The concurrent computing client 250 is in communication with the concurrent computing labs 170A-N and server 160 through network communication channels 130 over a network 140. One of ordinary skill in the art will appreciate that workstations 170A-N, server 160, and client 150 may have one or more concurrent computing lab. Each concurrent computing lab is an instance of the executable process 120.

The concurrent computing client 250 can be a technical computing software application that provides a technical computing and/or graphical modeling environment for generating block diagram models and to define mathematical algorithms for simulating models. The concurrent computing client 250 may include all or a portion of the functionality provided by the stand-alone desktop application of MATLAB®. Additionally, the concurrent computing client 250 can be any of the software programs available in the MATLAB® product family. Furthermore, the concurrent computing client 250 can be a custom software program or other software that accesses functionalities of software programs in the MATLAB® product family via an interface, such as an application programming interface, or by other means. One of ordinarily skill in the art will appreciate the various combinations of client types may access the functionalities of the system.

In one embodiment of the present invention, concurrent computing client 250 is also a concurrent computing lab. In such a configuration, communication channels are setup among all the concurrent computing labs (concurrent computing client 250 and concurrent computing labs 270A-N). Each of the concurrent computing labs (including the concurrent computing client 250) has its local copy of a computer program that is executed in the corresponding concurrent computing labs, so there is no main concurrent computing lab that distributes executions to the other concurrent computing labs. The concurrent computing client 250 will additionally have the functionality to accept inputs and/or commands from a user related to the computer program using a tool such as an Integrated Development Environment (IDE). The concurrent computing client 250 and concurrent computing labs 270A-N can be configured to perform distributed computing or parallel computing.

In one embodiment of the present invention, functions can be defined, by the concurrent computing client 250 with an application programming interface and/or programming language, representing a technical computing task to be executed by either a technical computing environment local to the client 150, or remote on the workstations 270A-N. Tasks can be declared on a concurrent computing client 250 and additionally organized into jobs. A job is a logical unit of activities, or tasks that are processed and/or managed collectively. A task defines a technical computing command, such as a MATLAB® command, to be executed, and the number of arguments and any input data to the arguments. A job is a group of one or more tasks.

In one aspect of the present invention, a task can be directly distributed by the concurrent computing client 250 to one or more computing resources, such as workstations 170A-N. A computing resource performs technical computing on a task and may return a result to the concurrent computing client 250.

In another aspect of the present invention, the system includes a server 160 on which runs a scheduler 260. The scheduler 260 can be a scheduler provided with executable process 120, a generic scheduler, or a third-party scheduler that is designed and provided a company or individual that does not provide executable process 120. For example, given that executable process 120 is parallel computing with MATLAB® by The MathWorks, Inc. of Natick, Mass., a third-party scheduler can be MPI Exec, LSF, Condor, Microsoft Compute Cluster Server, or PBS. The server 160 communicates over a network communication channel 130 on the network 140 to the workstations 170A-N. One of ordinary skill in the art will appreciate that any of the workstations 170A-N may include more than one technical computing lab to practice the present invention. Additionally, client 150 and server 160 may also include one or more concurrent computing labs.

The scheduler 260 comprises one or more application software components to provide for the automatic distribution of tasks from the concurrent computing client 250 to one or more of the concurrent computing labs 270A-N. The scheduler 260 allows the concurrent computing client 250 to delegate the management of task distribution to the scheduler 260. The scheduler may also set up for concurrent computing client 250 the concurrent computing labs 270A-N by using the information received from the concurrent computing client 250 regarding the number of concurrent computing labs needed and other configuration information. Hence, the concurrent computing client 250 does not need to know the specifics of the concurrent computing labs 270A-N. The concurrent computing client 250 can define a function to submit the task to the scheduler 260, and get a result of the task from the scheduler 260. As such, the scheduler 260 provides a level of indirection between the concurrent computing client 250 and the concurrent computing labs 270A-N.

This eases the distributed programming and integration burden on the concurrent computing client 250. The concurrent computing client 250 does not need to have prior knowledge of the availability of the workstations 170A-N. For multiple task submissions from the concurrent computing client 250, the scheduler 260 can manage and handle the delegations of the tasks to the concurrent computing labs 270A-N and hold the results of the tasks on behalf of the concurrent computing client 250 for retrieval after the completion of technical computing of all the tasks distributed by concurrent computing client 250. In an alternative implementation, the concurrent computing labs 270A-N may provide concurrent computing client 250 directly the results of the tasks assigned to concurrent computing labs 270A-N by the scheduler 260. The scheduler 260 can further include an object-oriented interface to provide control of delegating tasks and obtaining results in the system 200. The scheduler 260 also provides an interface for managing a group of tasks collectively as a single unit called a job, and on behalf of a concurrent computing client 250, submitting those tasks making up the job, and obtaining the results of each of the tasks until the job is completed. One of ordinarily skill in the art will recognize the functions and operations of the scheduler 260 can be separated into various software components, applications and interfaces. Additionally, the functions and operations of the scheduler 260 may reside on either the concurrent computing client 250 or one of the concurrent computing labs 270A-N instead of the server 160.

Additionally, each of the client 150, the server 160, and the workstations 170A-N can be running the same or different operating systems with the same or different processors. For example, the client 150 can be running Microsoft® Windows®, the server 160 can be running a version of Unix, and the workstations 170A-N a version of Linux. Alternatively, each of the client 150, the server 160 and the workstations 170A-N can be running Microsoft® Windows®. One of ordinarily skill in the art will recognize the various combinations of operating systems and processors that can be running on any of the computing devices (client 150, server 160, workstations 170A-N).

Figure 3:
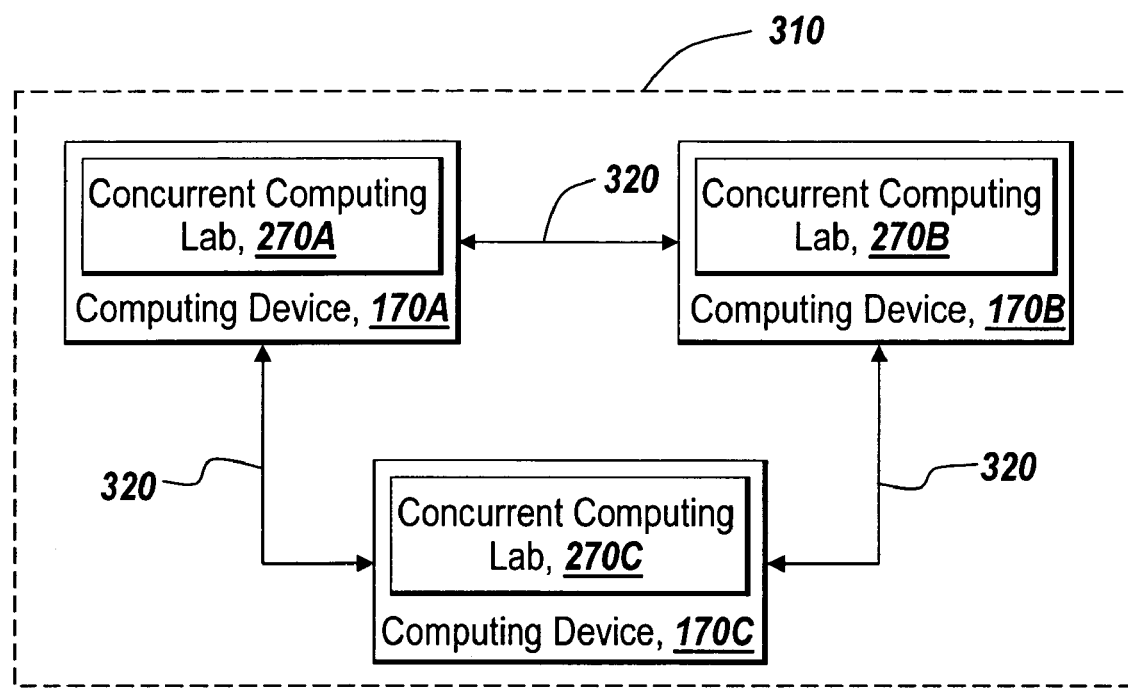
FIG. 3 is a block diagram illustrating a collaboration of concurrent computing labs in the illustrative embodiment of the present invention.

FIG. 3 illustrates a collaboration of the concurrent computing labs 270A, 270B, and 270C. The concurrent computing labs 270A, 270B, and 270C establish a communication channel 320 and form a collaboration 310. The concurrent computing labs 270A, 270B, and 270C may communicate via a MPI communication channel 320. In other embodiments, the concurrent computing labs 270A, 270B, and 270C can interface via socket based communications over TCP/IP implementing a custom message specification. In further embodiments, the concurrent computing labs 270A, 270B, and 270C may communicate using any available messaging communications products and/or custom solutions that allow the sending and receiving of messages among the concurrent computing labs 270A, 270B, and 270C. In certain embodiments, the communication channel 320 may include a file interfacing mechanism such as reading and writing to files on a network accessible directory or common file system. Furthermore, the concurrent computing labs 270A, 270B, and 270C can each be waiting or listening for messages from other concurrent computing labs 270A, 270B, and 270C. One of ordinary skill in the art will recognize the various types of interfaces to communicate messages among the concurrent computing labs 270A, 270B, and 270C.

In one embodiment of the present invention, the collaboration is dynamic. In other words, a user can modify or change the size of the collaboration by adding another computing resource. The user may be provided on the client 150 with a user interface to modify or change the size of the collaboration or designate a specific resource to add or remove from the collaboration. In another embodiment of the present invention, the client 150 can forward the information to the scheduler 260, which will determine a concurrent computing lab to be added or removed from the collaboration.

Figure 4:
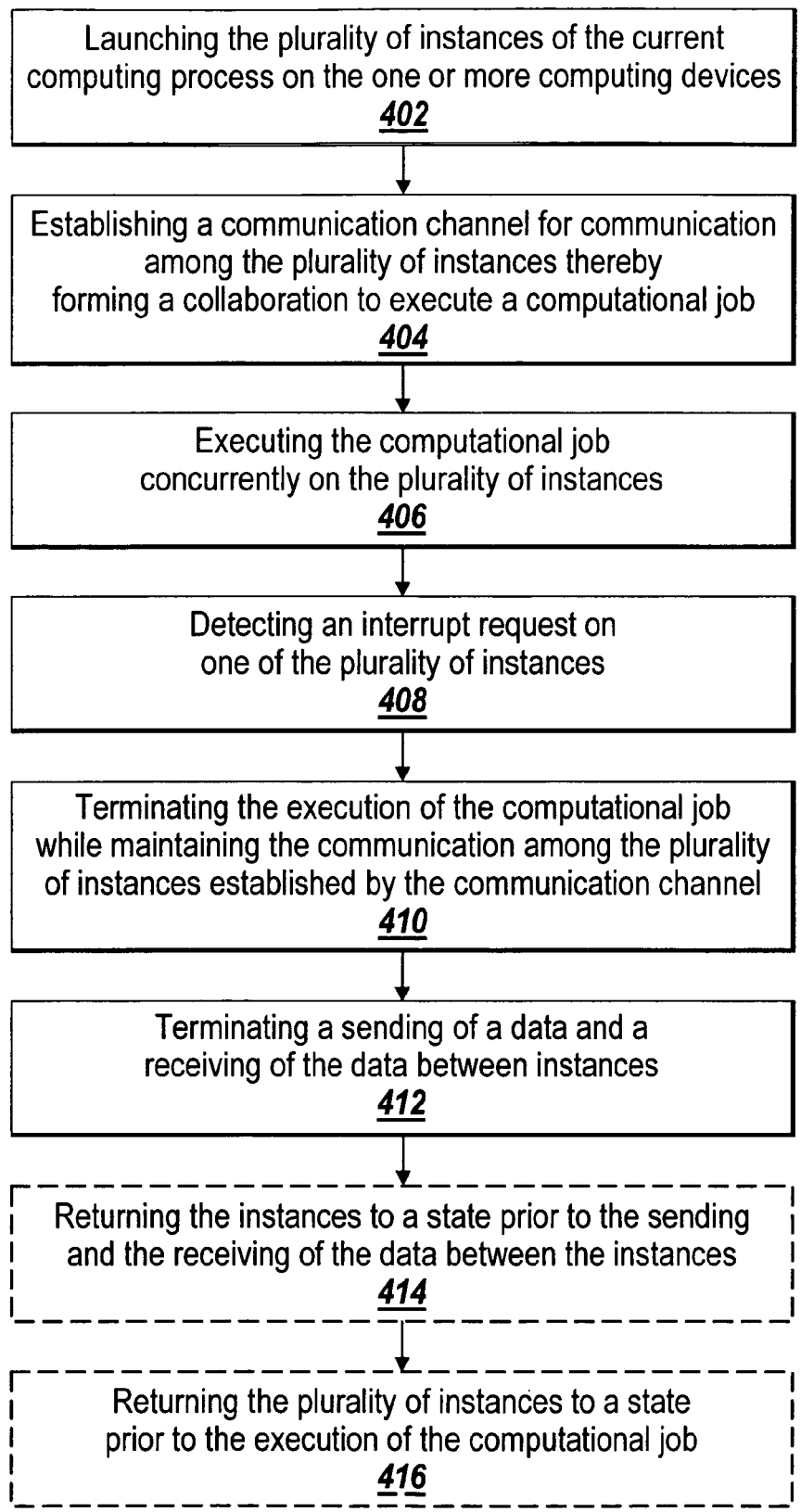
FIG. 4 illustrates a flowchart depicting steps taken to practice one embodiment of the present invention.

FIG. 4 illustrates a flowchart depicting steps taken to practice one embodiment of the present invention. In step 402, multiple instances of the executable process 120 are launched on one or more computing devices. A communication channel is established in step 404 for communication among the multiple instances. The multiple instances form a collaboration to execute a computational job. In step 406, the computational job is executed concurrently by the multiple instances. An interrupt request is detected in step 408 on one of the multiple instances. The interrupt request can come from a user who wants to terminate the computational job. The interrupt request can also be caused by an error in the executable process 120. Additionally, the interrupt request can be caused by an error in the communication channel, such as a deadlock of data or message sending and receiving between two or more instances. One of ordinary skill in the art will appreciate that there are many different reasons and ways that an interrupt request can be made. The execution of the computational job is terminated in step 410. However, the communication among the multiple instances established by the communication channel is not terminated. In one embodiment of the present invention, this can be done by making messages sent between the multiple instances to be interruptible. The following pseudo code shows how a "Receive" function call can be made interruptible, where MPI is the communication means between instances.

```
/*
 * Interrupting ongoing communication - this is the lowest level C-
 * code that implements the interruptible communication. This example
 * shows how a call to "Receive" can be made interruptible
 */
int interruptibleReceive(void * data, int count, MPI_Datatype type,
                         int source, int tag, MPI_Comm communicator)
```

-continued

```
{
    MPI_Request request;
    MPI_Status   status;
    int done = 0;
    /*
     * this return code will be overwritten if the user requests an
     * interrupt
     */
    int returnCode = NORMAL_COMPLETION;
    /*
     * MPI_Irecv returns a request handle which allows the state of
     * the request to be queried
     */
    MPI_Irecv(data, count, type, source, tag, communicator, &request);
    while(!done) {
        if(isInterruptPending( )) {
            /*
             * isInterruptPending returns true if the user has
             * requested interruption of the computation. Cancel this
             * request.
             */
            MPI_Cancel(request);
            done = 1;
            returnCode = INTERRUPT_REQUESTED;
        } else {
            /*
             * If the receive has completed, "done" will be true
             * after this call:
             */
            MPI_Test(request, &done, &status);
        }
        if(!done) {
            /*
             * Sleep a while to avoid blocking a processor
             */
            SLEEP_FCN(sleepAmount);
            /*
             * Use an algorithm to increase the amount of time that
             * we sleep on each iteration
             */
            sleepAmount = updateSleepAmount(sleepAmount);
        }
    }
    return returnCode;
}
```

One of ordinary skill in the art will appreciate that a corresponding interruptible function call to "Send" can be achieved the same way as the interruptible "Receive" function call. Therefore, an instance of the executable process 120 can make a function call to an interruptible function call to receive or send messages. When an interrupt request is detected, special actions can be taken to handle the interrupt request. In one embodiment of the present invention, a function call is made when an interrupt request is detected to handle the interrupt request. For example, using the same example from before, when a function call to interruptibleReceive returns a result that indicates an interrupt is requested, another function can be made to handle the interrupt request.

```
/*
 * This is the code that is linked directly to the MATLAB command
 * "labReceive".
 */
void labReceive( ... ) {
    int receiveCode = interruptibleReceive(data, count, type, source,
tag, communicator);
    if(receiveCode == INTERRUPT_REQUESTED) {
        handleInterrupt( );
    }
}
```

One of ordinary skill in the art will appreciate that there are many ways to handle an interrupt request. In one embodiment of the present invention, the execution of the computational job is terminated in step 410 while maintaining the communication among the multiple instances established by the communication channel 320. Additionally, data sending and receiving can be terminated between instances in step 412. Furthermore, pending data for sending or receiving by an instance can be flushed, so that the instance can return to a previous state before the interrupt request is made.

After an interrupt has been requested, each of the instances of the executable process 120 executing on the different concurrent computing lab needs to flush its message queue. For example, the following piece of MATLAB code can be run on all labs which have successfully been interrupted (given that the executable process 120 is parallel computing with MATLAB or distributed computing with MATLAB®):

```
while labProbe( 'any' )
    labReceive( 'any' );
end
```

This code simply queries the incoming message queue to check for messages from any instance of the executable process 120, and if there is a message, it will be received and taken out of the queue. The act of receiving messages in one instance of the executable process 120 may allow other instances of the executable process 120 to proceed and eventually respond to the interrupt request. Therefore, it is necessary to repeat the flushing procedure until all instances of the executable process 120 have completed a round of flushing together.

Depending on the type of the interrupt request, different actions can be taken and the instances can determine to return to a different previous state. In one embodiment of the present invention, the instances are returned to a state prior to the sending and the receiving of the data between the instances in step 414. In another embodiment of the present invention, the instances can be returned to a state prior to the execution of the computational job in step 416.

After the multiple instances start to execute a computational job, a user can interrupt the computational job by requesting an interrupt. An interrupt can be requested using a specific button provided by a graphical user interface of the executable process 120. Alternatively, an interrupt can be requested using one or more keystrokes on a keyboard, such as using Ctrl+C on the executable process 120. One of ordinary skill in the art will appreciate that there are many different ways the executable process 120 and/or the computing device 102 can provide for a user to interrupt execution of a computational job on the multiple instances of the executable process 120. Once a user interrupt request is detected by an instance of the executable process 120, a function call can be made to propagate the interrupt request to the rest of the instances in the collaboration 310. The following code shows a pseudo code for handling an interrupt request from a user.

```
/*
 * This function is hooked in to a user interface interrupt request.
 * This function is called on a separate thread to the main MATLAB
 * thread.
 */
void userInterrupt( ) {
    /*
```

```
                * ensure that handleInterrupt is called on the local process -
                * if the local process is not currently in an interruptible
                * send/receive, then flushMessages will still be called.
                */
               setInterruptPending(true);
               /*
                * Also forward the message to all other processes
                */
               int destination;
               for(destination = 0; destination < fMpiSize; destination++) {
                   if(destination != fMpiRank) {
                       /*
                        * Send interrupt message to each other la
                        * rpcCommunicator is a special communicator used to send
                        * and receive "control" rather than "data" messages.
                        * Because this is a separate communicator, messages on
                        * the other communicators will not interfere with
                        * messages sent this way.
                        */
                       MPI_Send(interruptMessage, ..., destination,
        rpcCommunicator);
                   }
               }
           }
```

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. In one or more computing devices, a method for providing exception handling among a plurality of instances of a concurrent computing process, the method comprising the steps of:
   launching the plurality of instances of the concurrent computing process on the one or more computing devices, wherein the plurality of instances includes:
   a first instance associated with a first instance incoming message queue, and
   a second instance associated with a second instance incoming message queue;
   establishing a communication channel for communication among the plurality of instances thereby forming a collaboration to execute a computational job, the computational job comprising a plurality of tasks to be executed concurrently using the plurality of instances;
   executing the computational job concurrently using the plurality of instances;
   detecting an interrupt request with the first instance; and
   terminating the execution of the computational job while maintaining the communication among the plurality of instances established by the communication channel, the terminating comprising flushing:
   the first instance incoming message queue, and
   the second instance incoming message queue.

2. The method of claim 1, wherein the interrupt request is sent from a user instructing the termination of the execution of the computational job.

3. The method of claim 1, wherein the interrupt request that is caused by an error occurred in the concurrent computing process.

4. The method of claim 1, wherein the interrupt request that is caused by an error occurred in the communication channel.

5. The method of claim 1 further comprising the steps of:
   notifying the first instance of the detecting of the interrupt request; and
   notifying the second instance of the detecting of the interrupt request.

6. The method of claim 5 further comprising the step of:
   terminating a sending of data and a receiving of data, the data transmitted between the first instance and the second instance.

7. The method of claim 6 further comprising the step of:
   returning the first instance and the second instance to a state prior to the sending and the receiving of the data.

8. The method of claim 1 further comprising the step of:
   returning the plurality of instances to a state prior to the execution of the computational job.

9. A non-transitory computer-readable storage medium storing computer-implemented instructions for providing exception handling among a plurality of instances of a concurrent computing process, said instructions comprising the instructions for:
   launching the plurality of instances of the concurrent computing process on one or more computing devices, wherein the plurality of instances includes:
   a first instance associated with a first instance incoming message queue, and
   a second instance associated with a second instance incoming message queue;
   establishing a communication channel for communication among the plurality of instances thereby forming a collaboration to execute a computational job, the computational job comprising a plurality of tasks to be executed concurrently using the plurality of instances;
   executing the computational job concurrently using the plurality of instances;
   detecting an interrupt request with the first instance; and
   terminating the execution of the computational job while maintaining the communication among the plurality of instances established by the communication channel, the terminating comprising flushing:
   the first instance incoming message queue, and
   the second instance incoming message queue.

10. The medium of claim 9, wherein the interrupt request is sent from a user instructing the termination of the execution of the computational job.

11. The medium of claim 9, wherein the interrupt request is caused by an error that occurred in the concurrent computing process.

12. The medium of claim 9, wherein the interrupt request is caused by an error that occurred in the communication channel.

13. The medium of claim 9 further comprising the instructions for:
   notifying the first instance of the detecting of the interrupt request; and
   notifying the second instance of the detecting of the interrupt request.

14. The medium of claim 13 further comprising the instruction for:
   terminating a sending of data and a receiving of data, the data transmitted between the first instance and the second instance.

15. The medium of claim 14 further comprising the instruction for:
   returning the first instance and the second instance to a state prior to the sending and the receiving of the data.

16. The medium of claim 9 further comprising the instruction for:
returning the plurality of instances to a state prior to the execution of the computational job.

17. A system providing exception handling among a plurality of instances of a concurrent computing process, the system comprises:
a processor executing an executable process comprising a concurrent computing environment for allowing a plurality of instances of the executable process to execute concurrently, the plurality of instances establishing communication via a communication channel and form a collaboration to execute a computational job, the computational job comprising a plurality of tasks to be executed concurrently using the plurality of instances, the plurality of instances comprising:
a first instance associated with a first instance incoming message queue, and
a second instance associated with a second instance incoming message queue,
wherein the executable process is capable of detecting an interrupt request associated with the computational job and terminating the execution of the computational job without terminating the communication via the communication channel, terminating the execution of the computational job comprising flushing:
the first instance incoming message queue, and
the second instance incoming message queue.

18. The system of claim 17, wherein the interrupt request is sent from a user instructing the termination of the execution of the computational job.

19. The system of claim 17, wherein the interrupt request that is caused by an error occurred in the concurrent computing process.

20. The system of claim 17, wherein the interrupt request that is caused by an error occurred in the communication channel.

21. A method for a computing device to distribute to a remote computing device a plurality of instructions, said method comprising:
receiving a request from the remote computing device for the plurality of instructions, wherein the plurality of instructions comprise instructions for:
launching the plurality of instances of the concurrent computing process on one or more computing devices, wherein the plurality of instances includes:
a first instance associated with a first instance incoming message queue, and
a second instance associated with a second instance incoming message queue;
establishing a communication channel for communication among the plurality of instances thereby forming a collaboration to execute a computational job, the computational job comprising a plurality of tasks to be executed concurrently using the plurality of instances;
executing the computational job concurrently using the plurality of instances;
detecting an interrupt request with the first instance; and
terminating the execution of the computational job while maintaining the communication among the plurality of instances established by the communication channel, the terminating comprising:
flushing the first instance incoming message queue, and
flushing the second instance incoming message queue; and
forwarding the plurality of instructions to the remote computing device.

* * * * *

UNITED STATES PATENT AND TRADEMARK OFFICE
CERTIFICATE OF CORRECTION

| | | |
|---|---|---|
| PATENT NO. | : 8,156,493 B2 | Page 1 of 1 |
| APPLICATION NO. | : 11/402748 | |
| DATED | : April 10, 2012 | |
| INVENTOR(S) | : Edric Ellis et al. | |

It is certified that error appears in the above-identified patent and that said Letters Patent is hereby corrected as shown below:

Title Page, Item (75) Inventor Edric Ellis, "Huntington" should be --Huntingdon--

Signed and Sealed this
Third Day of July, 2012

David J. Kappos
*Director of the United States Patent and Trademark Office*